United States Patent [19]

Kelly et al.

[11] Patent Number: 4,503,462

[45] Date of Patent: Mar. 5, 1985

[54] AUTOMATIC HOMING SYSTEM FOR A SUBSCRIPTION TELEVISION SIGNAL DECODER

[75] Inventors: Gordon E. Kelly, Algonquin; Richard G. Merrell, Hebron; Mutsuo Nakanishi, Glen Ellyn, all of Ill.

[73] Assignee: Zenith Electronics Corporation, Glenview, Ill.

[21] Appl. No.: 312,040

[22] Filed: Oct. 16, 1981

[51] Int. Cl.³ .......................... H04N 7/16; H04K 1/04
[52] U.S. Cl. .................................... 358/122; 358/114; 358/117; 358/193.1; 455/185
[58] Field of Search .................... 358/114, 117, 193.1, 358/122; 455/185

[56] References Cited

U.S. PATENT DOCUMENTS

| | | | |
|---|---|---|---|
| 4,079,419 | 3/1978 | Siegle et al. | 358/117 |
| 4,222,068 | 9/1980 | Thompson | 358/124 |
| 4,225,884 | 9/1980 | Block et al. | 358/122 |
| 4,323,922 | 4/1982 | Toonder | 358/117 |
| 4,430,669 | 2/1984 | Cheung | 358/117 |

Primary Examiner—S. C. Buczinski

[57] ABSTRACT

An automatic homing system for a subscription television signal decoder comprises a tuning system responsive to a decoder off-command signal for operation in a search mode wherein successive television channels are sequentially tuned until a subscription television signal is detected. As a result, the memory circuits of the decoder may be refreshed with updated subscriber authorization data in response to a transmitted subscription television signal even though the decoder is turned off.

10 Claims, 2 Drawing Figures

AUTOMATIC HOMING SYSTEM FOR A SUBSCRIPTION TELEVISION SIGNAL DECODER

BACKGROUND OF THE INVENTION

The present invention relates generally to subscription television signal decoders and, more particularly, to an improved homing system for automatically tuning a subscription television signal decoder which has been placed in an "off-mode" by a subscriber to a subscription television channel for receiving current subscriber authorization data.

In subscription television systems, television signals are typically transmitted to system subscribers in a scrambled form either along a coaxial cable or as an "over-the-air" broadcast. Each subscriber is provided with a decoder operable for unscrambling the subscription television signals, which unscrambeled signals are supplied to a conventional television receiver for viewing. Quite often, the decoders are of the multi-channel variety wherein subscription television signals transmitted over a plurality of television channels may be selectively tuned by a conventional subscriber operated tuning system before being applied to the unscrambling circuits. In such cases, the subscription television signals are frequently grouped into a number of levels or tiers each representing a different programming category such as sporting events, movies, etc., with the decoder of a particular subscriber being authorized for decoding or unscrambling the televised subscription programming signals in selected categories, the televised subscription programming signals in the remaining unauthorized categories being coupled on the television receiver in a scrambled and unviewable form. Of course, in such a system, all of the subscription television signals will be reproduced in a scrambled and unviewable form by a normal television receiver.

In a tiered subscription television system as described above, each system subscriber may selectively subscribe to one or more of the programming tiers as his or her interests dictate. To this end, each decoder, which is uniquely identified by a stored subscriber address code, includes a subscriber authorization register storing a subscriber authorization code identifying the program tiers which the subscriber is authorized to decode. The stored subscriber authorization code is compared to a program code typically transmitted during a selected horizontal line of the vertical intervals of a tuned subscription television signal, the program code identifying the programming level or tier of the accompanying television signal. If the stored subscriber authorization code and the broadcast program code result in a favorable comparison, suitable decode authorization signals are developed in the decoder enabling the received television signal to be decoded and coupled to the subscriber television receiver for viewing. On the other hand, if a proper match between the subscriber authorization code and the transmitted program code is not detected, indicating that the subscriber is not authorized to decode television signals in the programming tier identified by the broadcast program code, the decode authorization signals are not developed and the received television signal is not unscrambled by the decoder.

From time to time, it is necessary to update or refresh the stored subscriber authorization codes to reflect changes in the programming status of the subscribers, to completely de-authorize delinquent subscribers or, for example, to selectively authorize the decoding of special event or premium programs. Such updating or refreshing operations are typically accomplished by sequentially addressing the system decoders for entering the updated subscriber authorization codes during one or more horizontal lines of the vertical intervals of the broadcast subscription television signals. Since a relatively long period of time may be required to address all of the decoders in the system, it has been found convenient to at least partially execute the memory refreshing operation at night while the decoders are turned off. To facilitate such, much of the circuitry of the decoders, including the tuning system thereof, is maintained in an operational status even though the decoder is ostensibly turned off by the subscriber. In addition, steps must be taken to insure that, upon being turned off by a subscriber, the decoder tuner reverts or homes to a television channel through which subscription television signals are being transmitted and not to a channel used for transmitting normal un-encoded television signals. In the past, decoders have been designed such that their tuning systems would automatically home to a selected one of a limited number, e.g. four, of pre-programmed homing channels. Therefore, by selecting a pre-programmed homing channel which is also a subscription channel, the operator of the subscription system can insure that the tuning system of the decoder will home to a television channel enabling the decoders to be suitably refreshed when placed in an off-mode by the subscriber.

While such limited pre-programmed homing channel systems generally provide adequate flexibility, they are subject to a number of major disadvantages. Initially, there is the time and expense of selecting and pre-programming each decoder supplied to a system subscriber. Also, and perhaps more importantly, it is quite possible that the system operator might not be using any of the pre-programmed homing channels as a subscription channel in which case the tuning systems of each decoder must be custom programmed for the particular application. This leads to additional costs and represents a highly undesirable situation.

It is therefore a basic object of the present invention to provide an improved homing system for a subscription television signal decoder.

It is a more specific object of the invention to provide a homing system for a subscription television signal decoder which automatically homes or reverts to a subscription television channel when the decoder is placed in an off-mode of operation.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawing in which:

DESCRIPTION OF THE PREFERRED EMBODIMENT

Figure 1:
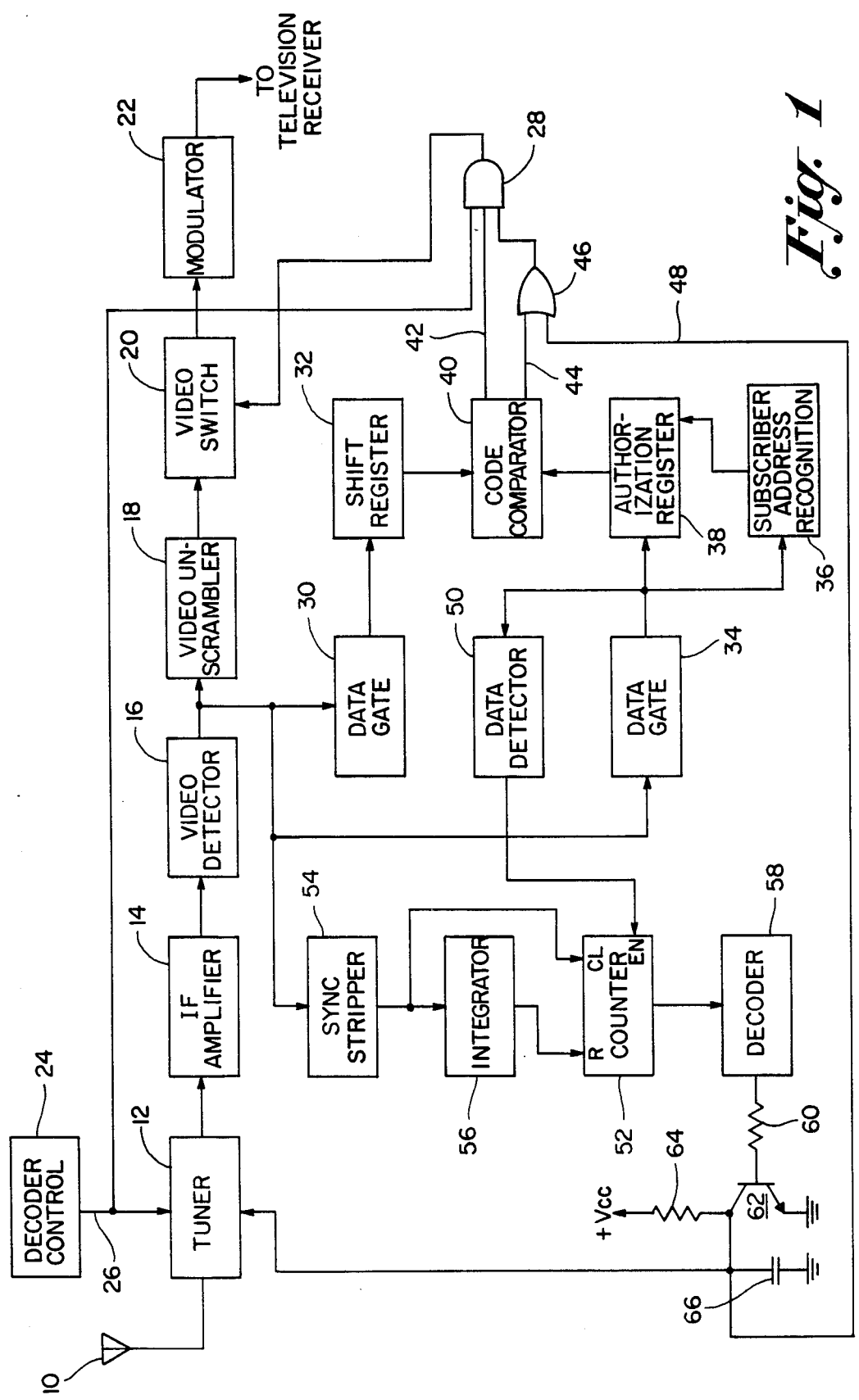
FIG. 1 is a block diagram showing a subscription television signal decoder incorporating an automatic homing system according to the present invention.

Referring to FIG. 1, there is illustrated a subscription television signal decoder operable for unscrambling a broadcast RF television signal. The scrambled subscription television signal may, for example, be derived as taught in U.S. Pat. No. 4,222,068 to Thompson by modifying a standard NTSC television signal by suppressing the amplitude of randomly selected horizontal blanking and synchronization pulses during the fields of the video signal. As a result, the horizontal deflection system of a normal television receiver will lock on random video peaks during the active or video trace line portions of the video signal rather than on the actual horizontal synchronization pulses resulting in the production of a scrambled video image on the viewing screen of the television receiver. In addition, the ability of the television receiver to use the color reference burst associated with the horizontal synchronization signals is severely degraded causing inaccurate color reproduction. In addition, a program code identifying the programming tier of the accompanying television signal is encoded in a horizontal line of each vertical interval of the television signal. Also, one or more vertical interval horizontal lines of the subscription television signal are normally used for transmitting the subscriber address and authorization codes. The latter codes are transmitted on a serial basis so that the decoder of each subscriber may be individually addressed and refreshed with an updated subscriber authorization code from time to time.

In one known subscription television system, for example, a five bit program code identifying the programming tier of the accompanying subscription television signal is transmitted during horizontal line 13 of each vertical interval while horizontal lines 10, 11 and 12 are each used to transmit a twenty bit subscriber address code together with a five bit subscriber authorization code. In this manner, the decoders may be addressed one at a time for updating the stored subscriber authorization codes which are compared with the transmitted program code on horizontal line 13 to determine whether a particular subscriber is authorized to decode the received subscription television signal.

With further reference to FIG. 1, the illustrated decoder comprises an antenna 10 adapted for intercepting broadcast RF television signals which may comprise either scrambled subscription television signals as described above or normal unscrambled television signals. The intercepted broadcast television signals are coupled from antenna 10 to a conventional television signal tuning system 12 which, as well known in the art, converts the received RF television signals to a suitable intermediate frequency signal. The intermediate frequency signal developed at the output of tuning system 12 is conventionally applied through an intermediate frequency amplifier 14 to the input of a video detector 16 whose output therefore comprises a baseband representation of the received television signal.

The composite baseband video signal developed at the output of video detector 16 is applied to the input of a video unscrambler 18 and therefrom through a video switch 20 to the input of a modulator 22. Video unscrambler 18 is adapted for unscrambling the baseband subscription television signal such as, for example, by restoring horizontal sync thereto. As will be explained in further detail hereinafter, video switch 20 is used to selectively gate the unscrambled subscription television signal to remodulator 22 depending upon whether the subscriber is authorized to decode the signal. Modulator 22 modulates the decoded baseband signal onto a standard television channel carrier and couples the modulated television signal to the antenna terminals of a conventional television receiver for viewing.

Subscriber operation of the decoder is facilitated by a decoder control unit 24. Decoder control 24, which may comprise either a remote controlled hand held device or a control unit integral with the decoder, provides means for controlling such functions as channel selection, ON/OFF mode selection, etc. Of particular significance in relation to the present invention is the ON/OFF mode selection signal developed on an output conductor 26 of decoder control 24. The ON/OFF mode selection signal, which is coupled to an input of tuning system 12 and also to 1 input of AND gate 28, assumes a logical 1 state when the decoder is turned on by the subscriber and assumes a logical 0 state when the decoder is turned off by the subscriber. When the decoder is turned on causing the ON/OFF mode selection signal to assume a logical 1 state, the decoder is operable for tuning and decoding a subscription television signal broadcast over a selected television channel and for coupling the decoded signal to a television receiver via modulator 22. As will be explained in further detail below, the decoder is also operable for tuning a nonsubscription television signal transmitted over a selected television channel for coupling to the television receiver via modulator 22. On the other hand, when the decoder is turned off causing the ON/OFF mode selection signal to assume a logical 0 state, video switch 20 is disabled whereby a blanked video signal is coupled to the input of modulator 22.

The composite baseband signal developed at the output of video detector 16 is also coupled to the input of a first data gate 30 which is adapted for gating the current program code developed on each horizontal line 13 of the subscription television signal to a shift register 32. The composite baseband video signal is also coupled to the input of a second data gate 34 which is adapted for gating the subscriber address codes transmitted on horizontal lines 10, 11 and 12 to the input of a subscriber address recognition circuit 36 and the accompanying subscriber authorization codes to the input of a subscriber authorization register 38. If a transmitted subscriber address code corresponds to the stored subscriber address code identifying a particular subscriber, an output is developed by recognition circuit 36 causing subscriber authorization register 38 to load the associated transmitted subscriber authorization code. By the foregoing means, it will be recognized that the subscriber's stored authorization code may be updated from time to time by the subscription television signal to reflect changes in his or her authorization status.

The current program code stored in shift register 32 and the subscriber authorization code stored in register 38 are coupled to the inputs of a code comparator 40. Code comparator 40 includes a first output 42 which is coupled to a second input of AND gate 28 and a second output 44 which is coupled to one input of an OR gate 46, the output of OR gate 46 being coupled to the third and final input of AND gate 28. A second input to OR gate 46 is derived from a conductor 48. Output 42 of code comparator 40 assumes a logical 0 state if the subscriber authorization code stored in register 38 corresponds to a value representing that the subscriber is not authorized to decode any of the programming tiers and assumes a logical 1 state if the subscriber is authorized to decode subscription television signals in one or more of the program tiers. Output 44 of code comparitor 40 assumes a logical 1 state if a comparison between the transmitted program code and the stored subscriber authorization code reflect that the subscriber is authorized to decode the transmitted subscription television signal and otherwise assumes a logical 0 level. As will be explained in further detail below, the signal on conductor 48 assumes a logical 0 state whenever the decoder is receiving a subscription television signal and assumes a logical 1 state when receiving a standard television signal.

In view of the foregoing, it will be appreciated that three separate conditions must be satisfied before AND gate 28 will enable video switch 20 for passing baseband video signals from video unscrambler 18 to modulator 22. Initially, the decoder must be turned on so that the ON/OFF mode selection signal is in a logical 1 state. Secondly, the stored subscriber authorization code must reflect a value such that the subscriber is authorized for decoding at least one programming tier so that the signal developed on output 42 of code comparator 40 is logical 1. And, finally, the output of OR gate 46 must be logical 1, this latter condition being satisfied either when a nonsubscription television signal is being transmitted or, if a subscription television signal is being transmitted, when the transmitted program code matches the stored subscriber authorization code such that the signal developed on output 44 of code comparator 40 is logical 1.

The development of the subscription television detection signal on conductor 48 is facilitated by coupling the output of data gate 34 to the input of a data detector 50. Data detector 50 is adapted for detecting the presence of the subscriber address and authorization codes transmitted during horizontal lines 10, 11 and 12 and develops an output signal in response thereto enabling a counter 52 during these three horizontal scanning lines. Counter 52 is clocked in response to the horizontal sync pulses of the transmitted television signal, which pulses are derived from the output of a sync stripper 54 connected to the output of video detector 16. The composite sync signal developed at the output of sync stripper 54 is also coupled through an integrator 56 to the reset input of counter 52 such that the counter is reset in response to the integrated vertical sync pulse at the beginning of each field of video. Therefore, counter 52 is reset at the beginning of each video field and enabled for counting the horizontal sync pulses associated with horizontal lines 10, 11 and 12 when a subscription television signal is being transmitted. After counting these horizontal sync pulses, the enable input of the counter is internally latched so that the counter continues counting horizontal sync pulses.

A decoder 58 decodes the state of counter 52 assumed in response to the horizontal sync pulse associated with horizontal scanning line 20 and couples a logical 1 signal for the duration of this line to the input of an integrator circuit through a resistor 60. The integrating circuit comprises a grounded emitter transistor 62 whose base is connected to resistor 60 and whose collector is connected to a source of supply potential through a resistor 64. The collector of transistor 62 is also connected to a grounded capacitor 66, to a control input of tuning system 12 and to conductor 48.

In operation, when a nonsubscription television signal is being transmitted, the output of decoder 58 is continuously logical 0 so that transistor 62 is held in a cut off state allowing capacitor 66 to charge and remain at the supply potential. As a consequence, a logical 1 signal is developed at the collector of transistor 62 representing that a normal of nonsubscription television signal is being transmitted. However, in response to the transmission of a subscription television signal, transistor 62 is rendered conductive during horizontal scanning line 20 of each video field allowing capacitor 66 to discharge to a level so as to present a logical 0 signal at the collector of transistor 62 representing that a subscription television signal is being transmitted. Component values are selected such that capacitor 66 will discharge at a relatively rapid rate during horizontal lines 20 but charge at a relatively slow rate so that the potential at the collector of transistor 62 will continuously reflect a logical 0 signal level as long as the subscription television signal is being transmitted.

As mentioned previously, when the decoder is being operated in its ON mode, i.e. the ON/OFF mode selection signal on conductor 26 being logical 1, the tuning system 12 is effective for tuning the television signal transmitted over a selected television channel. If the tuned television signal is a subscription television signal, the subscriber address and authorization codes transmitted during horizontal lines 10, 11 and 12 of the television signal may be used to update authorization register 38 as described above. If, on the other hand, the tuned television signal is a nonsubscription signal, then, of course, the memory updating operation cannot be carried out. Due to the large amount of time required to update the entire subscriber population, it has been found convenient to at least partially perform the memory updating operation at night or at any other time when the decoders are turned off. However, in order to make this feasible, means must be provided to insure that, upon being turned off, the tuning system of the decoder reverts or homes to a subscription television channel. The present invention is particularly concerned with an improved automatic homing system designed for homing to a subscription television channel after the decoder has been turned off regardless of the particular channels used to transmit subscription television signals.

When the decoder is turned offf, the ON/OFF mode selection signal developed on conductor 26 goes to logical 0, this logical 0 signal disabling video switch 20 and also being supplied to an input of tuning system 12. In addition, one or more indicator lights, e.g. channel number LED's may be extinguished in response to the logical 0 ON/OFF mode selection signal. The remaining circuitry of the decoder, however, remains fully operational. Tuning system 12 includes means, such as a suitably programmed microprocessor, for sensing the states of the logic signals coupled to its inputs from conductor 26 (the ON/OFF mode selection signal) and from the collector of transistor 62 (the subscription television detection signal). If the ON/OFF mode selection signal is logical 1, tuning system 12 operates in a normal fashion to tune a selected television channel. However, if the ON/OFF mode selection signal is logical 0, then tuning system 12 is placed in a special automatic homing mode. In this homing mode, tuning system 12 increments through successive television channels as long as a logical 1 signal is coupled to its control input from the collector of transistor 62. However, as soon as the signal at the collector of transistor 62 assumes a logical 0 state, the sequential operation of the tuner ceases and tuning is maintained for the channel causing the development of the logical 0 signal at the collector of transistor 62. Therefore, in response to the decoder being turned off, tuning system 12 is operated in a signal searching mode sequentially stepping through successive nonsubscription television signals until a subscription television signal is detected. Thereafter, tuning system 12 remains tuned to the detected subscription television signal facilitating the refreshing or updating of the decoder's memory circuits.

Figure 2:
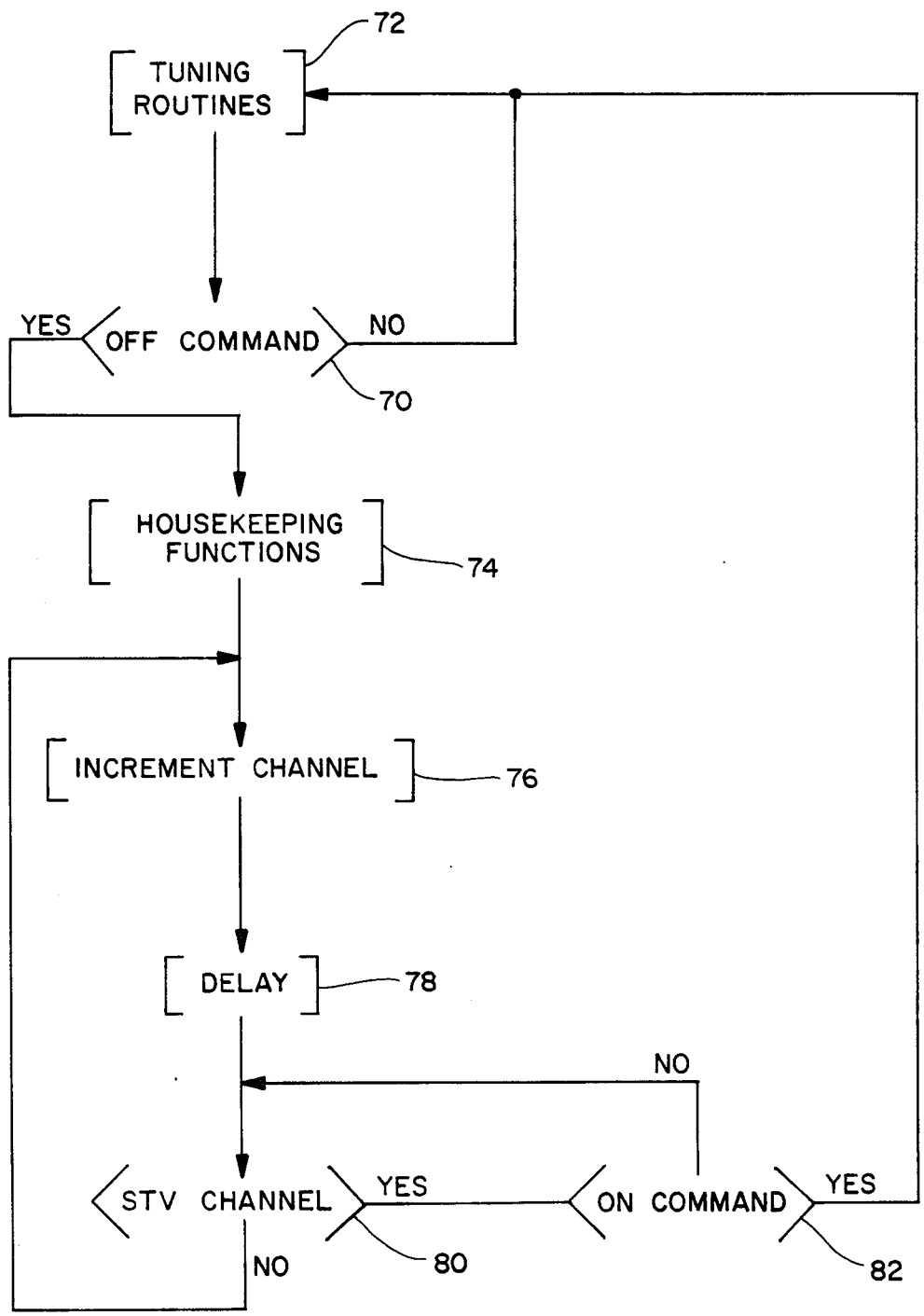
FIG. 2 is a flow chart illustrating the method of operating the tuning system of the decoder of FIG. 1 in the automatic homing mode.

FIG. 2 is a flow chart illustrating a method of programming tuning system 12 for realizing the foregoing operation. The tuning system continuously samples the ON/OFF mode selection signal developed on conductor 26 and makes a decision 70 as to whether the signal is logical 1 (decoder on mode) or logical 0 (decoder off mode). If the signal is logical 1, indicating that the decoder is in its on mode, the normal tuning routines 72 of the program are executed for tuning a selected television channel. If, on the other hand, a logical 0 signal is detected, indicating that the decoder is in its off mode, a number of housekeeping functions 74 are executed. The housekeeping functions include extinguishing any LED indicators and disabling video switch 20. Thereafter, an instruction 76 is executed incrementing the tuner to the next successive television channel and a short period of time is allowed to transpire per an instruction 78 to allow the decoder to stabilize at the signal transmitted over the tuned channel. The next successive channel to which the tuner is incremented in response to instruction 76 is either the channel characterized by the next successive channel number or, in the case where the tuner is tuned to the channel having the highest channel number, the channel characterized by the lowest channel number. Thus, by repetetively performing instruction 76, it is possible to continuously sequence through all of the channels in a cyclical manner.

Following the short delay represented by instruction 78, a decision 80 is made to determine whether the tuned television signal is a subscription television signal, this decision being based on the logic state of the signal coupled to tuning system 12 from the collector of transistor 62. If the signal is logical 1, indicating that the tuned television signal is a nonsubscription signal, a NO decision is reached causing instructions 76 and 78 to be repeated. The loop consisting of instructions 76 and 78 and decision 80 will therefore be continuously repeated until a logical 0 signal, representing that the tuned television signal is a subscription signal, is detected at the collector of transistor 62. In the latter case, decision 80 results in a YES response whereby channel tuning is no longer incremented. At this time, tuning system 12 is tuned to a subscription television channel enabling the updating of its memory circuits as previously described. Tuning system 12 remains tuned to the subscription television channel so long as the ON/OFF mode selection signal remains logical 0 as determined by decision 82. However, as soon as this signal goes to logical 1, representing that the decoder has been turned on, control is returned to the normal tuning routine 72.

What has thus been shown is an improved automatic homing system for a subscription television decoder. The system automatically homes to a subscription television channel by operating in a search mode wherein successive television channels are tuned until a subscription television channel is detected whenever the decoder is turned off. As a result, the memory circuits of the decoder may be updated in response to a transmitted subscription television signal even though the decoder is turned off.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. An automatic homing system for a television signal decoder, said television signal decoder including a memory adapted for storing subscriber data transmitted during selected horizontal lines of the vertical intervals of each of a plurality of scrambled television signals broadcast over a plurality of respective television channels, comprising:

control means selectively operable for establishing a decoder on-mode signal representing that said decoder is in use or a decoder off-mode signal representing that said decoder is not in use;

tuning means responsive to said on-mode signal for tuning a selected television channel;

subscriber data recognition means responsive to the information content of said subscriber data for presenting subscriber data addressed to said decoder for storage in said memory; and subscriber data presence detecting means coupled to said tuning means for developing a control signal in response to a tuned television signal being characterized by the presence of said subscriber data independent of the information content represented thereby;

said tuning means being responsive to said off-mode signal for sequentially tuning successive television channels until a channel is tuned which results in the development of said control signal, whereby said memory may be updated by said subscriber data in response to the establishment of said off-mode signal.

2. An automatic homing system according to claim 1 wherein said tuning means includes a control input, said tuning means being responsive to said off-mode signal and to a first logic level signal applied to said control input for sequentially tuning successive television channels and responsive to said off-mode signal and to a second logic level signal applied to said control input for tuning a single television channel.

3. An automatic homing system according to claim 2 wherein said detecting means includes an output coupled to said tuning means control input, said detecting means output being characterized by said second logic level signal in response to a tuned television signal characterized by the presence of said subscriber data and otherwise being characterized by said first logic level signal.

4. An automatic homing system according to claim 3 wherein said detecting means comprises capacitive means coupled to said detecting means output, means for discharging said capacitive means to a value corresponding to said second logic level signal in response to a tuned television signal being characterized by the presence of said subscriber data and means otherwise charging said capacitive means to a value corresponding to said first logic level signal.

5. An automatic homing system according to claim 4 wherein said means for discharging comprises switching means coupled to said capacitive means and means for rendering said switching means conductive for discharging said capacitive means for a relatively short time interval at least once during each field of a standard television signal.

6. For use in a television subscription system in which subscriber data is encoded into the vertical intervals of each of a plurality of scrambled RF television signals transmitted over respective television channels, a decoder comprising:

control means selectively operable for establishing a decoder on-mode signal representing that said decoder is in use or a decoder off-mode signal representing that said decoder is not in use;

tuning means operable for converting a broadcast RF television signal to a corresponding baseband television signal;

memory means adapted for storing subscriber data presented thereto;

subscriber data recognition means responsive to the information content of said subscriber data for presenting only the subscriber data addressed to said decoder for storage in said memory means; and subscriber data presence detecting means coupled to said tuning means for developing a control signal in response to said baseband television signal being characterized by the presence of said subscriber data independent of the information content represented thereby, said tuning means being responsive to said off-mode signal for sequentially tuning successive television channels until a channel is tuned which results in the development of said control signal.

7. A decoder according to claim 6 wherein said tuning means includes a control input, said tuning means being responsive to said off-mode signal and to a first logic level signal applied to said control input for sequentially tuning successive television channels and responsive to said off-mode signal and to a second logic level signal applied to said control input for tuning a single television channel.

8. A decoder according to claim 7 wherein said detecting means includes an output coupled to said tuning means control input, said detecting means output being characterized by said second logic level signal in response to a tuned television signal characterized by the presence of said subscriber data and otherwise being characterized by said first logic level signal.

9. A decoder according to claim 8 wherein said detecting means comprises capacitive means coupled to said detecting means output, means for discharging said capacitive means to a value corresponding to said second logic level signal in response to a tuned television signal characterized by the presence of said subscriber data and means otherwise charging said capacitive means to a value corresponding to said first logic level signal.

10. A decoder according to claim 9 wherein said means for discharging comprises switching means coupled to said capacitive means and means for rendering said switching means conductive for discharging said capacitive means for a relatively short time interval during each field of a standard television signal.

* * * * *